United States Patent

Gupta et al.

[11] Patent Number: 5,963,949
[45] Date of Patent: Oct. 5, 1999

[54] METHOD FOR DATA GATHERING AROUND FORMS AND SEARCH BARRIERS

[75] Inventors: Ashish Gupta, Menlo Park; Peter Norvig, Palo Alto; Anand Rajaraman, Mountain View, all of Calif.

[73] Assignee: Amazon.com, Inc., Seattle, Wash.

[21] Appl. No.: 08/995,868

[22] Filed: Dec. 22, 1997

[51] Int. Cl.⁶ .................................................. G06F 17/30
[52] U.S. Cl. ............................ 707/100; 707/102; 707/3; 707/4
[58] Field of Search .................... 707/100, 102, 707/3, 4, 9, 104; 395/200.47, 200.57, 200.61

[56] References Cited

U.S. PATENT DOCUMENTS

| | | | |
|---|---|---|---|
| 5,708,825 | 1/1998 | Sotomayor | 707/501 |
| 5,715,453 | 2/1998 | Stewart | 707/104 |
| 5,737,592 | 4/1998 | Nguyen et al. | 707/4 |
| 5,745,754 | 4/1998 | Lagarde et al. | 707/104 |
| 5,768,578 | 6/1998 | Kirk et al. | 707/100 |
| 5,790,785 | 8/1998 | Klug et al. | 380/4 |
| 5,804,803 | 9/1998 | Cragun et al. | 235/375 |
| 5,826,258 | 10/1998 | Gupta et al. | 707/4 |
| 5,835,905 | 11/1998 | Pirolli et al. | 707/3 |
| 5,864,871 | 1/1999 | Kitain et al. | 707/104 |
| 5,884,309 | 3/1999 | Vanechanos, Jr. | 707/10 |

Primary Examiner—Thomas G. Black
Assistant Examiner—Sanjiv Shah
Attorney, Agent, or Firm—Townsend and Townsend and Crew LLP

[57] ABSTRACT

According to the invention, methods for gathering data around forms having one or more fields, enabling a wrapper program to extract semistructured information by determining combinations of values for fields associated with particular forms; submitting the particular forms repeatedly for all combinations of interest and providing the results returned for further processing. In select embodiments, the combinations of values for fields is a Cartesian product of the possible values for the fields. Values to be submitted in the form fields may be specified by using a programming language such as Site Description Language (SDL) or Java.

38 Claims, 7 Drawing Sheets

(STEP 102 OF FIG. 2A)

| State | Any ▼ |
| Job Category | Any ▼ |
| Sorts Results by Field: | Job Category ▼ |
| Submit  Reset | |

*FIG. 3A*

```
<FORM ACTION="/cgi-bin/jobpost/exquery"METHOD="POST">
<HR>
<p> <INPUT TYPE=hidden NAME="jcrno" VALUE="">
<PRE> State <SELECT NAME="state"><OPTION SELECTED> Any <OPTION>...</SELECT>
<BR> Job Category <SELECT NAME="job category"><OPTION SELECTED> Any <OPTION>...
<SELECT>
<BR> Sort results by field:<SELECT NAME="sort"><OPTION SELECTED VALUE="category">Job
Category<OPTION VALUE="jrcno">Posting#<OPTION VALUE="location">Location<OPTION
VALUE="none"> No Sort</SELECT></PRE><INPUT TYPE=submit VALUE="Submit"><INPUT
TYPE=reset VALUE="Reset">
</FORM>
<HR>
```

*FIG. 3B*

For pages that use a *BUTTON*
"Press here for NEXT 10 listings"
(HTML FORM with method = get)

*FIG. 3C*

```
EX: <a href="/corp/careers?location=Reston,
%20VA&&max=10&beginning=10">Next 10</a>   <font><form
method=get action="/corp/careers">
```

*FIG. 3D*

For pages that use a *FORM*
"Get Next 25 Jobs"
(HTML FORM with method = POST type=submit)

*FIG. 3E*

```
EX: <FORM Action="http://www.ccc.com/cgi=bin/jobsearch.cgi"
METHOD="POST"><input type="hidden" name="orginalsearch"
value="xboax?25"><input type="submit" value="Get Next 25
Jobs"></FORM>
```

*FIG. 3F*

(STEP 406 OF FIG. 4A)

METHOD FOR DATA GATHERING AROUND FORMS AND SEARCH BARRIERS

CROSS-REFERENCE TO RELATED APPLICATIONS

This application makes reference to the following commonly owned U.S. Patent Application, which is incorporated herein in its entirety for all purposes:

U.S. patent application Ser. No. 08/724,943, now U.S. Pat. No. 5,826,258 in the name of Ashish Gupta, et. al., entitled "Method and Apparatus for Structuring the Querying and Interpretation of Semistructured Information," relates to information retrieval and interpretation from disparate semistructured information resources.

COPYRIGHT NOTICE

A portion of the disclosure of this patent document contains material which is subject to copyright protection. The copyright owner has no objection to the facsimile reproduction by anyone of the patent document or the patent disclosure as it appears in the Patent and Trademark Office patent file or records, but otherwise reserves all copyright rights whatsoever.

BACKGROUND OF THE INVENTION

This invention relates to the retrieval and interpretation of disparate semistructured information from diverse sources, and particularly to the retrieval of information from form representations. The invention is especially useful in the extraction of information from public and semipublic databases through worldwide information sources, as facilitated by the Internet.

The Internet provides avenues for worldwide communication of information, ideas and messages. Although the Internet has been utilized by academia for decades, recently public interest has turned to the Internet and the information made available by it. The World Wide Web (or "the Web") accounts for a significant part of the growth in the popularity of the Internet, due in part to the user-friendly graphical user interfaces ("GUIs") that are readily available for accessing the Web.

The World Wide Web makes hypertext documents available to users over the Internet. A hypertext document does not present information linearly like a book, but instead provides the reader with links or pointers to other locations so that the user may jump from one location to another. The hypertext documents on the Web are written in the Hypertext Markup Language ("HTML").

As the popularity of the World Wide Web grows, so too does the wealth of information it provides. Accordingly, there may be many sites and pages on the World Wide Web that contain information a user is seeking. A number of web sites (e.g., Yahoo, Alta Vista, Excite, etc.) enable users to perform simple keyword searches. However, the Web contains no built-in mechanism facilitating searching for information of interest. Without a searching mechanism, finding sites of interest is like finding a needle in a haystack.

Although keyword searches are adequate for many applications, they fail miserably for many others. For example, there are numerous web sites that include multiple entries or lists on job openings, houses for sale, and the like. Keyword searches are inadequate to search these sites for many reasons. Keyword searches invariably turn up information that, although matching the keywords, is not of interest. This problem may be alleviated somewhat by narrowing the search parameters, but this has the attendant risk of missing information of interest. Additionally, the search terms supported may not allow identification of information of interest. As an example, one may not be able to specify in a keyword search query to find job listings that require less than three years of experience in computer programming.

Ideally, it would be desirable if information like job listings on multiple web sites could appear as a single relational database so that relational database queries could be utilized to find information of interest. However, there is no standard for the structure of information like job listings on the Web. This problem was addressed in a co-owned, co-pending U.S. patent application Ser. No. 08/724,943, in the name of Ashish Gupta, et. al., entitled "Method and Apparatus for Structuring the Querying and Interpretation of Semistructured Information," which introduced the concept of "Wrappers" for retrieving and interpreting information from disparate semistructured information sources. Wrappers are programs that interact with web sites to obtain information stored in the web site and then to structure it according to a prespecified schema. Therefore, a wrapper needs to be able to "access" web sites much the same as a web browser.

Forms are an increasingly popular way of rendering web sites. Forms typically consist of one or more fields that need to be filled in with values. The fields that are displayed in forms may be represented in different ways, for example, as pull down menus, select lists, check boxes or fill-in text boxes. To obtain information from the web site, a user fills in values for each field and submits the form in order to receive a resulting response page. Thus, it is necessary that wrappers be able to interact with sites that present form interfaces.

What is needed is a method for data gathering around forms and other barriers, enabling wrappers to have the capability of extracting information from form based web sites.

SUMMARY OF THE INVENTION

The present invention provides methods for indexing around forms having one or more fields, enabling a wrapper program to extract semistructured information by determining combinations of values for fields associated with particular forms; submitting the particular forms repeatedly for all combinations of interest and providing the results returned for further processing. In select embodiments, the combinations of values for fields is a Cartesian product of the possible values for the fields. Values to be submitted in the form fields may be specified by using a programming language such as Site Description Language (SDL) or Java.

An advantage of the present invention is that it enables data mining techniques to be applied to web sites rendered as forms.

A further advantage of the present invention is that it facilitates access to information imbedded within forms via SQL or other relational database query methods.

The invention will be better understood upon reference to the following detailed description and its accompanying drawings.

BRIEF DESCRIPTION OF THE DRAWINGS

FIG. 3A depicts an example of a form;

FIG. 3B depicts the HTML to produce the form depicted in FIG. 3A;

FIG. 3C depicts an example of a GET type form;

FIG. 3D depicts the HTML to produce the form depicted in FIG. 3C;

FIG. 3E depicts an example of a POST type form;

FIG. 3F depicts the HTML to produce the form depicted in FIG. 3E;

DETAILED DESCRIPTION OF THE SPECIFIC EMBODIMENTS 1.0 Introduction

The present invention provides a method for retrieval and interpretation of disparate semistructured information from diverse sources using form based representations, such as web pages on the World Wide Web. Systems using methods according to the invention enable data mining techniques to be applied to web sites rendered as forms, as well as facilitate access to information imbedded within forms via SQL or other relational database query methods. Table 1 provides a definitional list of terminology used herein.

TABLE 1

LIST OF DEFINITIONAL TERMS

| | |
|---|---|
| Semi-struc-tured infor-mation | Information that as a whole does not have a precise structure, however, elements within the semistructured information have meanings based on their location or surroundings within the semistructured information. The format of semistructured information often is represented by regular expressions, typically nested regular expressions. However, this is not a requirement for information to be semistructured information. |
| Site | A location or object including related, interconnected collection of blocks of text, forms, and the like. For example, a web site may present text as semistructured information in the form of a web page. |
| User Agent | A component visible to a user. For example, an agent may include a user interface that accepts a user's relational database query and displays the results of the query. |

TABLE 1-continued

LIST OF DEFINITIONAL TERMS

| | |
|---|---|
| Wrap-per (or site pro-gram) | A software layer that provides a relational database interface to information on a site. |
| Map-per | A component responsible for translating the different site vocabularies into one that an agent understands. Mappers generally reside between agents and wrappers, providing a level of insulation between the two. |

1.1 Hardware Overview

Figure 1A:
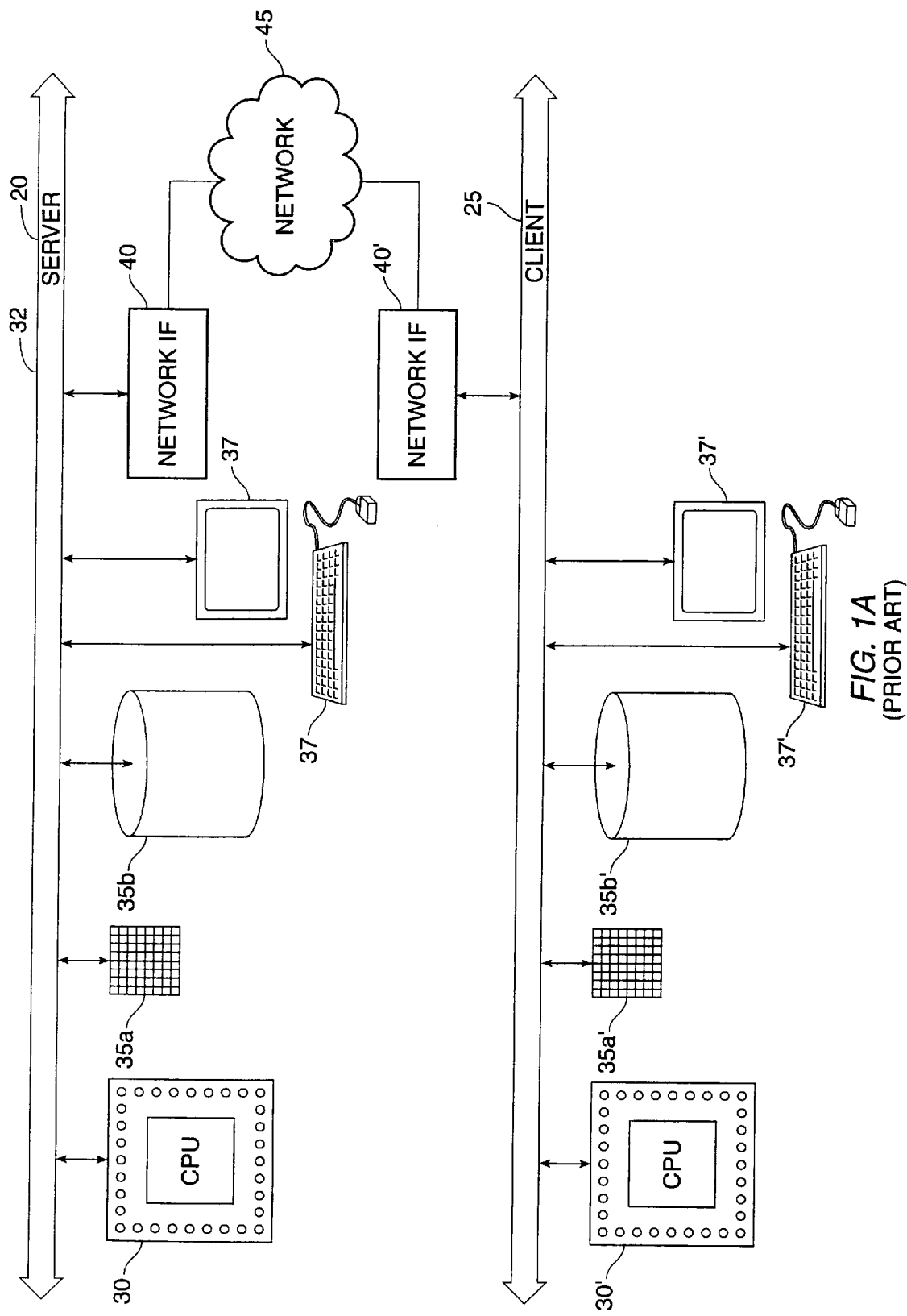
FIG. 1A depicts a representative client server relationship in accordance with a particular embodiment of the invention.

The method for data gathering around forms and other barriers in order to extract semistructured information of the present invention is implemented in the Perl and Java programming language and is operational on a computer system such as shown in FIG. 1A. This invention may be implemented in a client-server environment, but a client-server environment is not essential. FIG. 1A shows a conventional client-server computer system which includes a server 20 and numerous clients, one of which is shown as client 25. The use of the term "server" is used in the context of the invention, wherein the server receives queries from (typically remote) clients, does substantially all the processing necessary to formulate responses to the queries, and provides these responses to the clients. However, server 20 may itself act in the capacity of a client when it accesses remote databases located at another node acting as a database server.

The hardware configurations are in general standard and will be described only briefly. In accordance with known practice, server 20 includes one or more processors 30 which communicate with a number of peripheral devices via a bus subsystem 32. These peripheral devices typically include a storage subsystem 35, comprised of memory subsystem 35a and file storage subsystem 35b, which hold computer programs (e.g., code or instructions) and data, set of user interface input and output devices 37, and an interface to outside networks, which may employ Ethernet, Token Ring, ATM, IEEE 802.3, ITU X.25, Serial Link Internet Protocol (SLIP) or the public switched telephone network. This interface is shown schematically as a "Network Interface" block 40. It is coupled to corresponding interface devices in client computers via a network connection 45.

Client 25 has the same general configuration, although typically with less storage and processing capability. Thus, while the client computer could be a terminal or a low-end personal computer, the server computer is generally a high-end workstation or mainframe, such as a SUN SPARC™ server. Corresponding elements and subsystems in the client computer are shown with corresponding, but primed, reference numerals.

The user interface input devices typically includes a keyboard and may further include a pointing device and a scanner. The pointing device may be an indirect pointing device such as a mouse, trackball, touchpad, or graphics tablet, or a direct pointing device such as a touchscreen incorporated into the display. Other types of user interface input devices, such as voice recognition systems, are also possible.

The user interface output devices typically include a printer and a display subsystem, which includes a display controller and a display device coupled to the controller. The display device may be a cathode ray tube (CRT), a flat-panel device such as a liquid crystal display (LCD), or a projection device. Display controller provides control signals to the display device and normally includes a display memory for storing the pixels that appear on the display device. The display subsystem may also provide non-visual display such as audio output.

The memory subsystem typically includes a number of memories including a main random access memory (RAM) for storage of instructions and data during program execution and a read only memory (ROM) in which fixed instructions are stored. In the case of Macintosh-compatible personal computers the ROM would include portions of the operating system; in the case of IBM-compatible personal computers, this would include the BIOS (basic input/output system).

The file storage subsystem provides persistent (non-volatile) storage for program and data files, and typically includes at least one hard disk drive and at least one floppy disk drive (with associated removable media). There may also be other devices such as a CD-ROM drive and optical drives (all with their associate removable media). Additionally, the computer system may include drives of the type with removable media cartridges. The removable media cartridges may, for example be hard disk cartridges, such as those marketed by Syquest and others, and flexible disk cartridges, such as those marketed by Iomega. One or more of the drives may be located at a remote location, such as in a server on a local area network or at a site of the Internet's World Wide Web.

In this context, the term "bus subsystem" is used generically so as to include any mechanism for letting the various components and subsystems communicate with each other as intended. With the exception of the input devices and the display, the other components need not be at the same physical location. Thus, for example, portions of the file storage system could be connected via various local-area or wide-area network media, including telephone lines. Similarly, the input devices and display need not be at the same location as the processor, although it is anticipated that the present invention will most often be implemented in the context of PCs and workstations.

Bus subsystem 32 is shown schematically as a single bus, but a typical system has a number of buses such as a local bus and one or more expansion buses (e.g., ADB, SCSI, ISA, EISA, MCA, NuBus, or PCI), as well as serial and parallel ports. Network connections are usually established through a device such as a network adapter on one of these expansion buses or a modem on a serial port. The client computer may be a desktop system or a portable system.

The user interacts with the system using interface devices 37' (or devices 37 in a standalone system). For example, client queries are entered via a keyboard, communicated to client processor 30', and thence to network interface 40' over bus subsystem 32'. The query is then communicated to server 20 via network connection 45. Similarly, results of the query are communicated from the server to the client via network connection 45 for output on one of devices 37' (say a display or a printer), or may be stored on storage subsystem 35'.

Figure 1B:
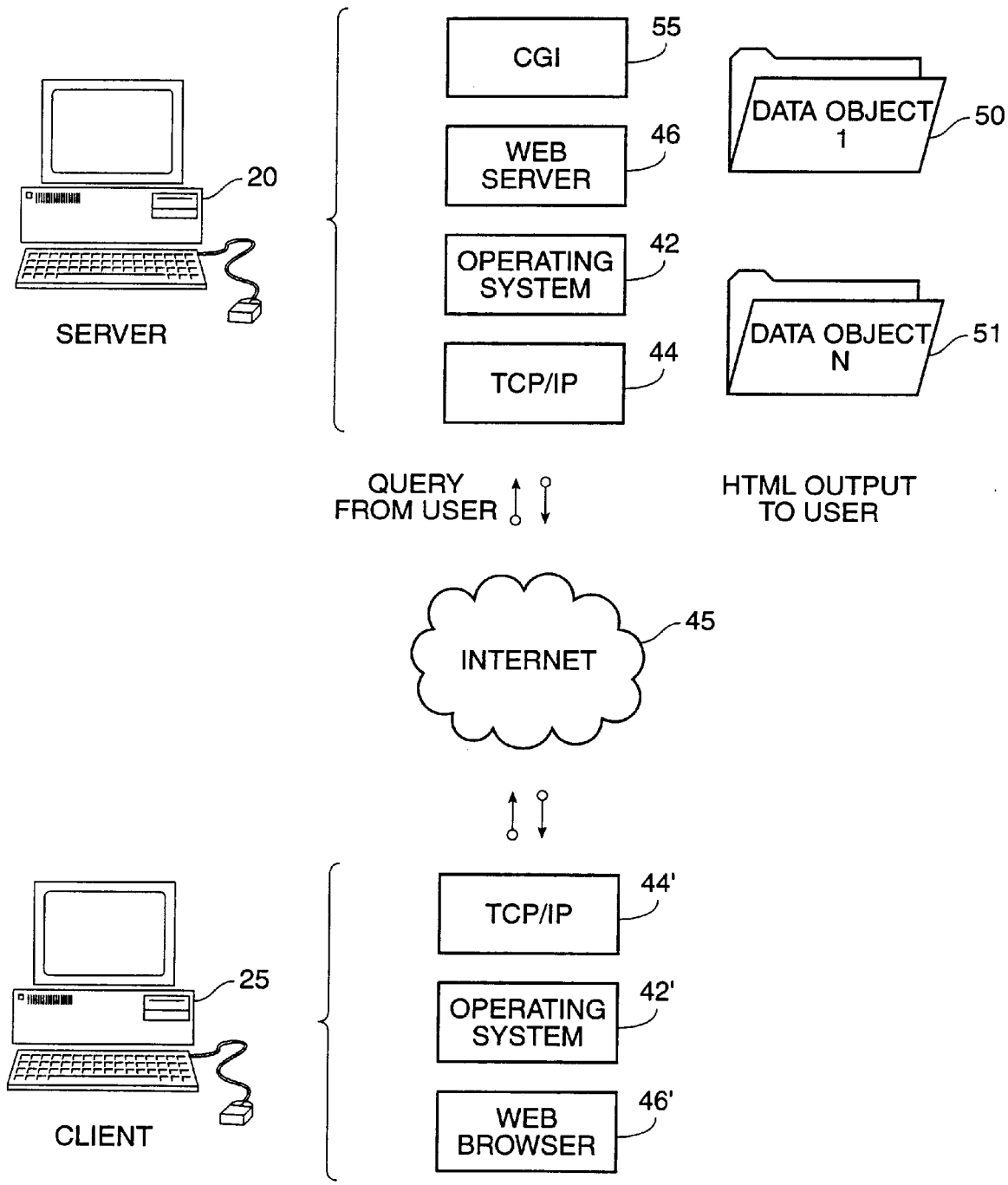
FIG. 1B depicts a functional perspective of the representative client server relationship in accordance with a particular embodiment of the invention.

FIG. 1B is a functional diagram of the computer system of FIG. 1A. FIG. 1B depicts a server 20, and a representative client 25 of a multiplicity of clients which may interact with the server 20 via the internet 45 or any other communications method. Blocks to the right of the server are indicative of the processing components and functions which occur in the server's program and data storage indicated by block 35a in FIG. 1A. A TCP/IP "stack" 44 works in conjunction with Operating System 42 to communicate with processes over a network or serial connection attaching Server 20 to internet 45. Web server software 46 executes concurrently and cooperatively with other processes in server 20 to make data objects 50 and 51 available to requesting clients. A Common Gateway Interface (CGI) script 55 enables information from user clients to be acted upon by web server 46, or other processes within server 20. Responses to client queries may be returned to the clients in the form of a Hypertext Markup Language (HTML) document outputs which are then communicated via internet 45 back to the user.

Client 25 in FIG. 1B possesses software implementing functional processes operatively disposed in its program and data storage as indicated by block 35a' in FIG. 1A. TCP/IP stack 44', works in conjunction with Operating System 42' to communicate with processes over a network or serial connection attaching Client 25 to internet 45. Software implementing the function of a web browser 46' executes concurrently and cooperatively with other processes in client 25 to make requests of server 20 for data objects 50 and 51. The user of the client may interact via the web browser 46' to make such queries of the server 20 via internet 45 and to view responses from the server 20 via internet 45 on the web browser 46'.

1.2 Network Overview

Figure 1C:
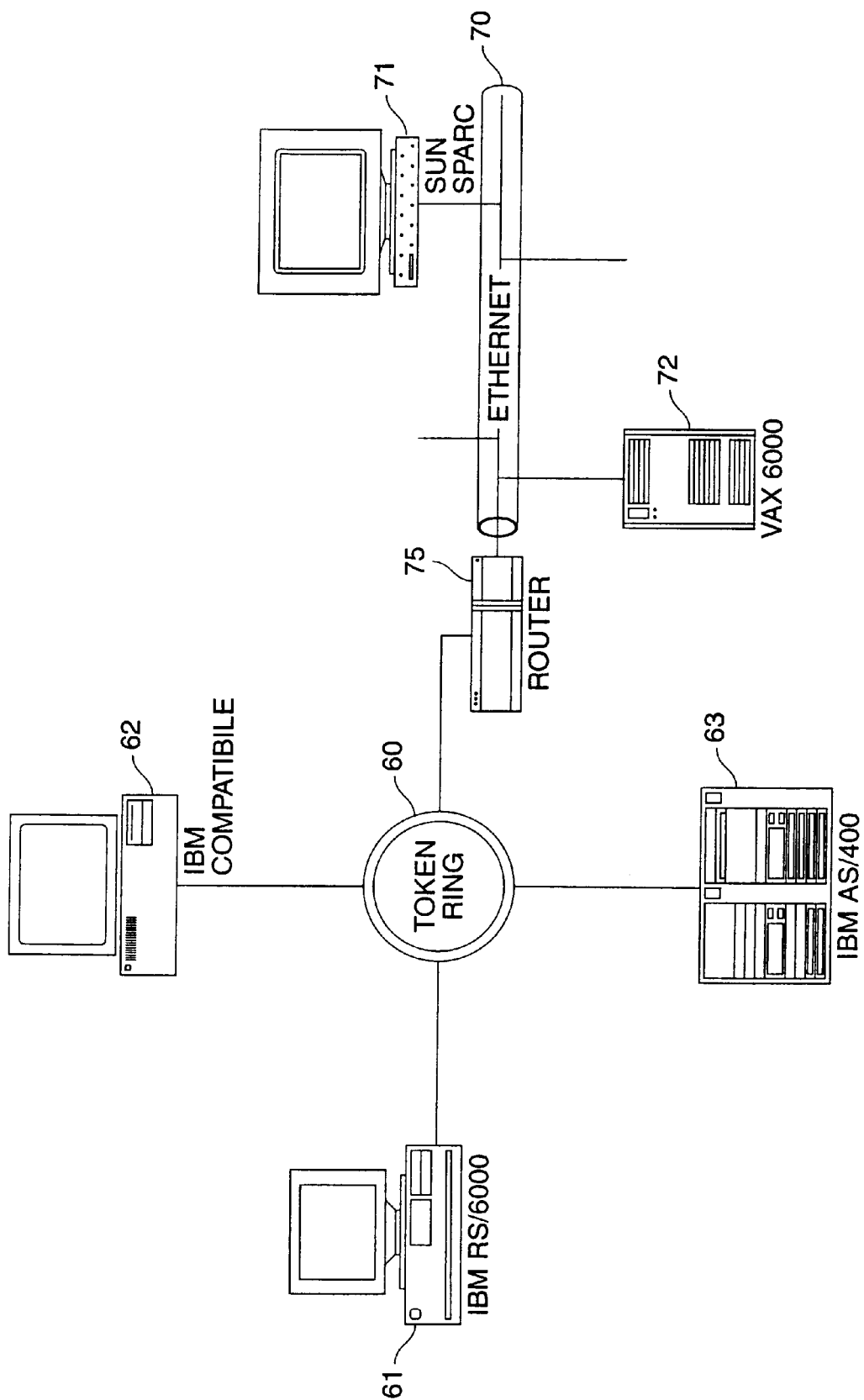
FIG. 1C depicts a representative internetworking environment in accordance with a particular embodiment of the invention.

FIG. 1C is illustrative of the internetworking of a plurality of clients such as client 25 of Figs. 1A and 1B and a multiplicity of servers such as server 20 of FIGS. 1A and 1B as described herein above. In FIG. 1C, a network 70 is an example of a Token Ring or frame oriented network. Network 70 links a host 71, such as an IBM RS6000 RISC workstation, which may be running the AIX operating system, to a host 72, which is a personal computer, which may be running Windows 95, IBM OS/2 or a DOS operating system, and a host 73, which may be an IBM AS/400 computer, which may be running the OS/400 operating system. Network 70 is internetworked to a network 60 via a system gateway which is depicted here as router 75, but which may also be a gateway having a firewall or a network bridge. Network 60 is an example of an Ethernet network that interconnects a host 61, which is a SPARC workstation, which may be running SUNOS operating system with a host 62, which may be a Digital Equipment VAX6000 computer which may be running the VMS operating system.

Router 75 is a network access point (NAP) of network 70 and network 60. Router 75 employs a Token Ring adapter and Ethernet adapter. This enables router 75 to interface with the two heterogeneous networks. Router 75 is also aware of the Inter-network Protocols, such as ICMP ARP and RIP, which are described below.

Figure 1D:
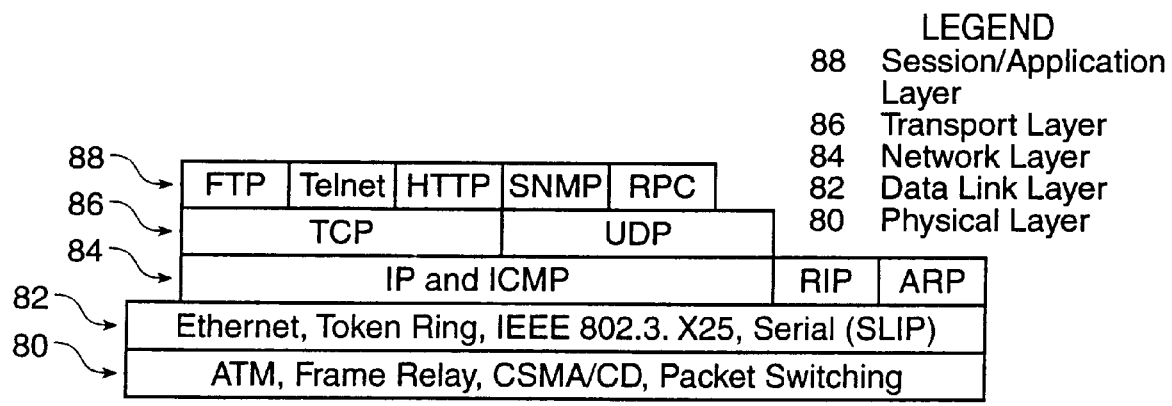
FIG. 1D depicts a relationship diagram of the layers of the TCP/IP protocol suite.

FIG. 1D is illustrative of the constituents of the Transmission Control Protocol/internet Protocol (TCP/IP) protocol suite. The base layer of the TCP/IP protocol suite is the physical layer 80, which defines the mechanical, electrical, functional and procedural standards for the physical transmission of data over communications media, such as, for example, the network connection 45 of FIG. 1A. The physical layer may comprise electrical, mechanical or functional standards such as whether a network is packet switching or frame-switching; or whether a network is based on a Carrier Sense Multiple Access/Collision Detection (CSMA/CD) or a frame relay paradigm.

Overlying the physical layer is the data link layer 82. The data link layer provides the function and protocols to transfer data between network resources and to detect errors that may occur at the physical layer. Operating modes at the datalink layer comprise such standardized network topologies as IEEE 802.3 Ethernet, IEEE 802.5 Token Ring, ITU X.25, or serial (SLIP) protocols.

Network layer protocols 84 overlay the datalink layer and provide the means for establishing connections between networks. The standards of network layer protocols provide operational control procedures for internetworking communications and routing information through multiple heterogenous networks. Examples of network layer protocols are the Internet Protocol (IP) and the Internet Control Message Protocol (ICMP). The Address Resolution Protocol (ARP) is used to correlate an Internet address and a Media Access Address (MAC) of a particular host. The Routing Information Protocol (RIP) is a dynamic routing protocol for passing routing information between hosts on networks. The Internet Control Message Protocol (ICMP) is an internal protocol for passing control messages between hosts on various networks. ICMP messages provide feedback about events in the network environment or can help determine if a path exists to a particular host in the network environment. The latter is called a "Ping". The Internet Protocol (IP) provides the basic mechanism for routing packets of information in the Internet. IP is a non-reliable communication protocol. It provides a "best efforts" delivery service and does not commit network resources to a particular transaction, nor does it perform retransmissions or give acknowledgments.

The transport layer protocols 86 provide end-to-end transport services across multiple heterogenous networks. The User Datagram Protocol (UDP) provides a connectionless, datagram oriented service which provides a non-reliable delivery mechanism for streams of information. The Transmission Control Protocol (TCP) provides a reliable session-based service for delivery of sequenced packets of information across the Internet. TCP provides a connection oriented reliable mechanism for information delivery.

The session, or application layer 88 provides a list of network applications and utilities, a few of which are illustrated here. For example, File Transfer Protocol (FTP) is a standard TCP/IP protocol for transferring files from one machine to another. FTP clients establish sessions through TCP connections with FTP servers in order to obtain files. Telnet is a standard TCP/IP protocol for remote terminal connection. A Telnet client acts as a terminal emulator and establishes a connection using TCP as the transport mechanism with a Telnet server. The Simple Network Management Protocol (SNMP) is a standard for managing TCP/IP networks. SNMP tasks, called "agents", monitor network status parameters and transmit these status parameters to SNMP tasks called "managers." Managers track the status of associated networks. A Remote Procedure Call (RPC) is a programming interface which enables programs to invoke remote functions on server machines. The Hypertext Transfer Protocol (HTTP) facilitates the transfer of data objects across networks via a system of uniform resource indicators (URI).

The Hypertext Transfer Protocol is a simple protocol built on top of Transmission Control Protocol (TCP). It is the mechanism which underlies the function of the World Wide Web. The HTTP provides a method for users to obtain data objects from various hosts acting as servers on the Internet. User requests for data objects are made by means of an HTTP request, such as a GET request. A GET request as depicted below is comprised of 1) the GET request keyword; followed by 2) the full path of the data object; followed by 3) the name of the data object; followed by 4) an HTTP protocol version, such as "HTTP/1.0". In the GET request shown below, a request is being made for the data object with a path name of "/pub/" and a name of "MyData.html":

GET /pub/MyData.html HTTP-Version     (1)

Processing of a GET request entails the establishing of an TCP/IP connection with the server named in the GET request and receipt from the server of the data object specified. After receiving and interpreting a request message, a server responds in the form of an HTTP RESPONSE message.

Response messages begin with a status line comprising a protocol version followed by a numeric Status Code and an associated textual Reason Phrase. These elements are separated by space characters. The format of a status line is depicted in line (2):

Status-Line=HTTP-Version Status-Code Reason-Phrase     (2)

The status line always begins with a protocol version and status code, e.g., "HTTP/1.0 200". The status code element is a three digit integer result code of the attempt to understand and satisfy a prior request message. The reason phrase is intended to give a short textual description of the status code.

The first digit of the status code defines the class of response. There are five categories for the first digit. 1XX is an information response. It is not currently used. 2XX is a successful response, indicating that the action was successfully received, understood and accepted. 3XX is a redirection response, indicating that further action must be taken in order to complete the request. 4XX is a client error response. This indicates a bad syntax in the request. Finally, 5XX is a server error. This indicates that the server failed to fulfill an apparently valid request.

2.0 Defining a Wrapper for Semi-Structured Information

The process of generating a wrapper for extracting attributes of interest from semistructured information, such as from web data objects, for incorporation into a relational database is more fully described in U.S. patent application Ser. No. 08/724,943, now U.S. Pat. No. 5,826,258 in the name of Ashish Gupta, et. al., entitled "Method and Apparatus for Structuring the Querying and Interpretation of Semistructured Information," which is incorporated herein by reference for all purposes. The wrapper extracts the attributes of interest from the semistructured information and produces tuples, which may be provided to a relational database system. Once the wrapper for specific semistructured information is executed, a user may generate a relational database query (e.g., SQL query) which operates on the tuples produced by the wrapper. Accordingly, the relational database system views the semistructured information as one or more database tables as a result of the wrapper's processing.

Figure 2A:
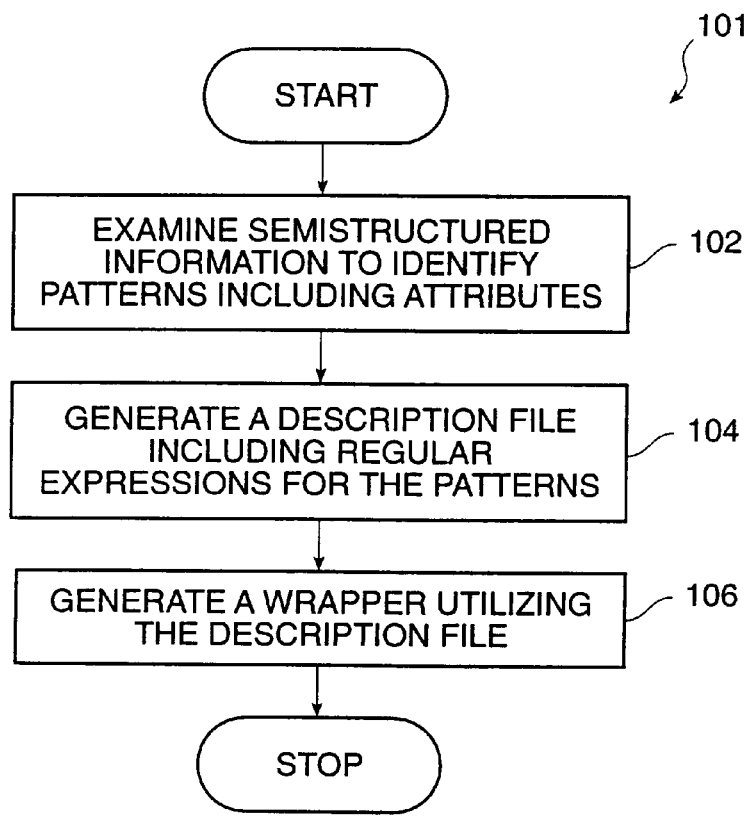
FIG. 2A depicts a flowchart of process steps in producing a wrapper in accordance with a particular embodiment of the invention.

FIG. 2A depicts a flowchart 101 of a processes of defining, generating and using a wrapper to access semistructured information from disparate semistructured information sources. As previously taught in the art, a wrapper may be described using a description language called a Site Description Language (SDL), which provides mechanisms for specifying different types of interactions between the wrapper and data sources. In a step 102, semistructured information is examined to identify patterns including attributes. In step 104, SDL statements describing patterns are specified in a definitional file. Next, in a step 106, the definitional file produced in step 104 is acted upon by a compiler or an interpreter to produce a wrapper. Typically, multiple wrappers corresponding to different semistructured information are generated for a particular application. Additionally, one or more mappers may be provided in order to translate attributes within semistructured information to fields in the relational database schema.

Figure 2B:
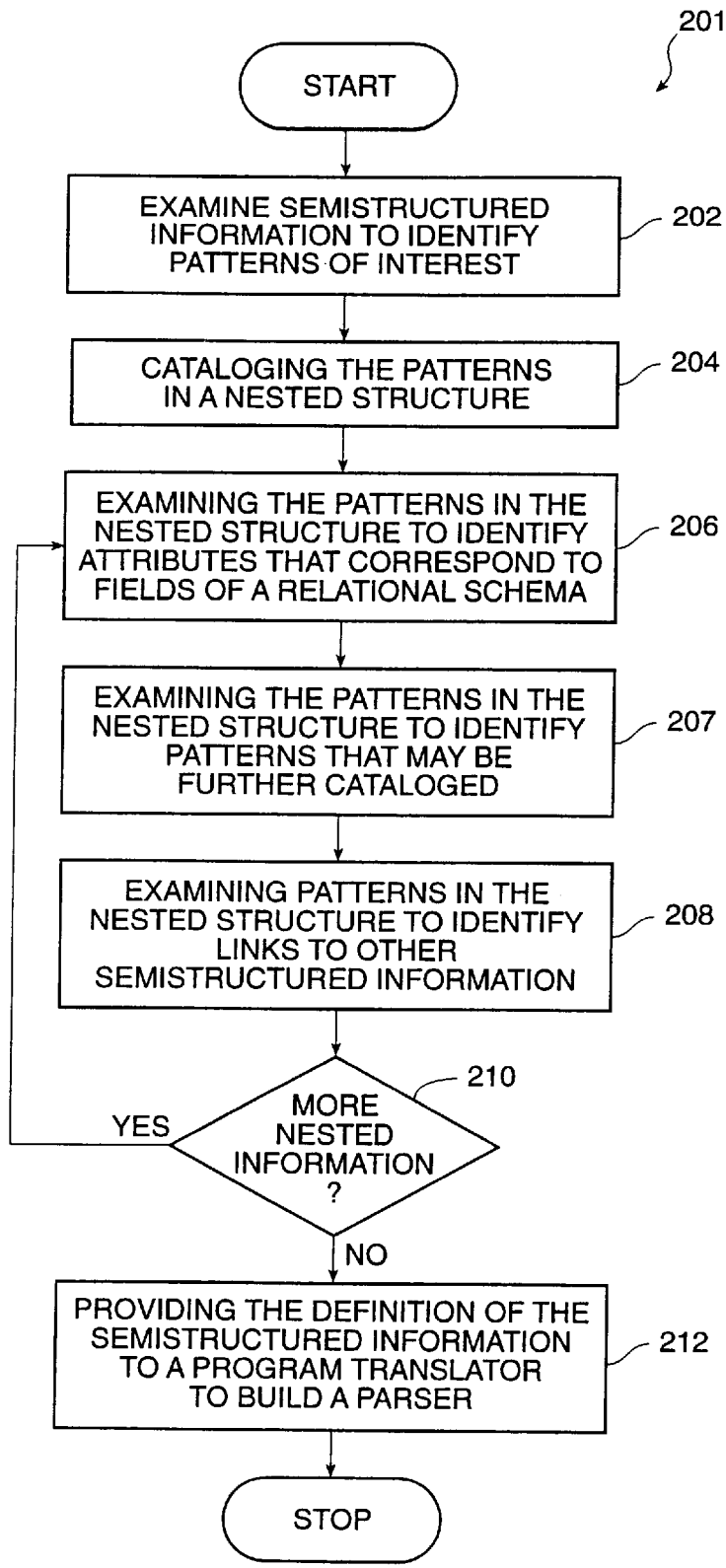
FIG. 2B depicts a flowchart of process steps in defining a wrapper in accordance with a particular embodiment of the invention.

FIG. 2B depicts a flowchart 201 showing the process steps for defining a wrapper according to step 102 of flowchart 101. In step 202, the semistructured information is examined for repetitive patterns of interest using lexical analysis techniques, as are well known to persons of ordinary skill in the art. These repetitive patterns of interest include one or more attributes.

In step 204, the occurrences of the patterns in the semistructured information are cataloged by name and position in a nested structure without a priori information, i.e., there is no requirement that a user have prior knowledge or perform any prior programming before the patterns are cataloged. In one embodiment, the nested structure is a graph representing the nesting of the attributes within the semistructured information. Typically, many of the attributes of the nested structure correspond to fields of a relational database schema.

In a step 206, the patterns in the nested structure are examined to identify attributes that correspond to fields of a relational database schema. After these attributes are identified, regular expressions are generated that specify the location of the attributes within the semistructured information. The regular expressions may be generated as soon as these attributes are identified or when the definition of the semistructured information is written to a file. Thus, the generation of the regular expressions need not be performed at any specific time.

In step 207, the patterns in the nested structure are examined to identify patterns that may be further cataloged. Some patterns of interest may be further broken down into sub-component patterns of interest. Each one of these patterns that is identified is decomposed into its constituent patterns. These constituent patterns are then cataloged in the nested structure for further examination.

In a step 208, the patterns in the nested structure are examined to identify links to other semistructured information. The links identified in step 208 point to other semistructured information that may include patterns of interest and attributes. The links are traversed to further semistructured information, which is examined for patterns of interest. If patterns of interest are discovered, they are cataloged in the nested structure. Typically, the links are Uniform Resource Locator ("URL") addresses of web pages. However, the links may also point to a program which, when executed, will generate semistructured information output. In the later case, the program is executed and the output is examined.

In a decisional step 210, it is determined whether there is more nested information to examine. If more nested information exists, then it is examined to identify attributes corresponding to fields in the relational database schema identified in step 206. Although steps 206, 207 and 208 are shown in a particular order, it is not required that these steps, like many other steps in the flowcharts, be performed in the order shown. Thus, the order shown in the flowcharts is to illustrate one embodiment and not intended to limit the invention.

Otherwise, if there is not more nested information to examine, then in a step 212, a definition of the semistructured information is provided, which serves as input to a program translator to build a parser. This definition of the semistructured information comprises regular expressions having attributes corresponding to fields of the relational database schema. The regular expressions specify locations of the attributes within the semistructured information that correspond to the relational database schema. Thus, the wrapper, produced by the program translator, includes a parser that is capable of parsing the semistructured information for attributes so that these attributes can be presented to a relational database system as tuples when the wrapper executes.

In one embodiment, the program translator is a compiler, which generates a parser by receiving the definition file as input and generating a program (i.e., the parser) for extracting attributes from the semistructured information that correspond to fields of the relational database schema to form tuples. In an alternative embodiment, the program translator is an interpreter, which generates a parser from the definition of the semistructured information and the semistructured information as inputs, by extracting attributes from the semistructured information that correspond to fields of the relational schema to form tuples.

2.1 Specifying to a Wrapper Information to Submit a Form

FIG. 3A depicts a representative form having a state field 301 a job category field 302, a sort results by field 303, a submit button 304, and a reset button 305. FIG. 3B depicts HTML statements which produce the form of FIG. 3A.

Figure 4A:
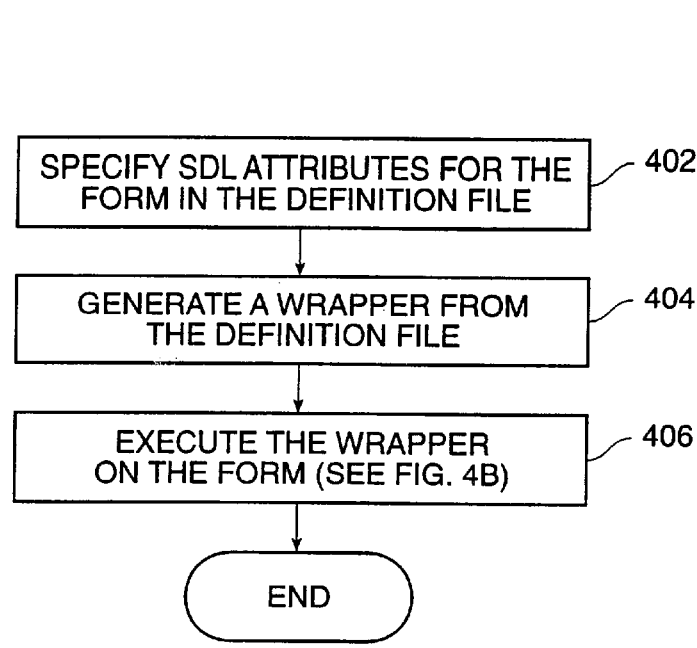
FIG. 4A depicts a flowchart of process steps in defining a form to be processed by a wrapper in accordance with a particular embodiment of the invention.

FIG. 4A depicts a flowchart 401 showing the process steps of defining a wrapper cable of obtaining information from a form, such as the representative form of FIG. 3A. In a step 402, information to be submitted with the various fields of a form, such as the form of FIG. 3A, may be specified using a Site Description Language (SDL) "form" regular expression. The SDL form expression provides a means for capturing the resulting interactions with a diverse body of data sources. A form is one such data source type that is supported by SDL. In the form of FIG. 3A for example, the user would specify an SDL form statement to obtain information from the form page as shown in lines 1–6.

| | |
|---|---|
| 1. | FORM :: $form_url :: |
| 2. | ' '-> #FIELD(jcrno) |
| 3. | 'Any'-> #FIELD(state) |
| 4. | 'Any'-> #FIELD(job_category) |
| 5. | 'category'-> #FIELD(sort) |
| 6. | $output <= submit |

Line 1 indicates that the code fragment identifies information used to process a form. The term $form_url refers to the URL, i.e., web address, of the form. This URL corresponds to the address of the example form of FIG. 3A. In order to obtain the data accessible by a form, the wrapper must submit the form with a plurality of different combinations of values for the fields of the form. However, not all combinations may be necessary or of interest. The possible values for each field are often specified in the form itself and may be obtained from the URL.

Line 3 indicates that the "state" field of the form in FIG. 3A is to be given the value of "any." Similarly, line 4 specifies that the "job_category" field of the form in FIG. 3A is to be given the value of "any." Line 5 specifies that the "sort" field of the form of FIG. 3A is to be given the value "category," and line 6 specifies that the data returned to the wrapper from the submission of the form is to be stored in the variable $output. Note that if a field such as "state" does not accept a value of "any," then acceptable values for the "state" field would be coded as depicted in line 7.

7. 'CA', 'MA'<=INPUT(state)

Line 7 indicates that the form expects the "state" field to be filled in and that this form specifically requires that the "state" field be assigned the values "CA" (California) and then "MA" (Massachusetts). Thus, coding the line of SDL depicted in line 6 will cause a wrapper to fill in the form and submit it twice. First with "state" assigned the value of "CA" and second with "state" assigned the value of "MA."

Not all fields in a particular form require values to be specified for them in the SDL forms statement. Since the URL for the form leads to the options specified in the form as it appears on the web, the wrapper may use these values as default values for any fields that are not explicitly assigned values in a form statement.

In a step 404, the definitional file containing SDL regular expressions, including the FORM statement coded in step 402, is used to generate a wrapper, as described herein above. Finally, in a step 406, the wrapper program is executed to interact with web or other sources of semistructured information, having the form described by the FORMS statement coded in step 402.

3.0 Processing of Form Statements

Figure 4B:
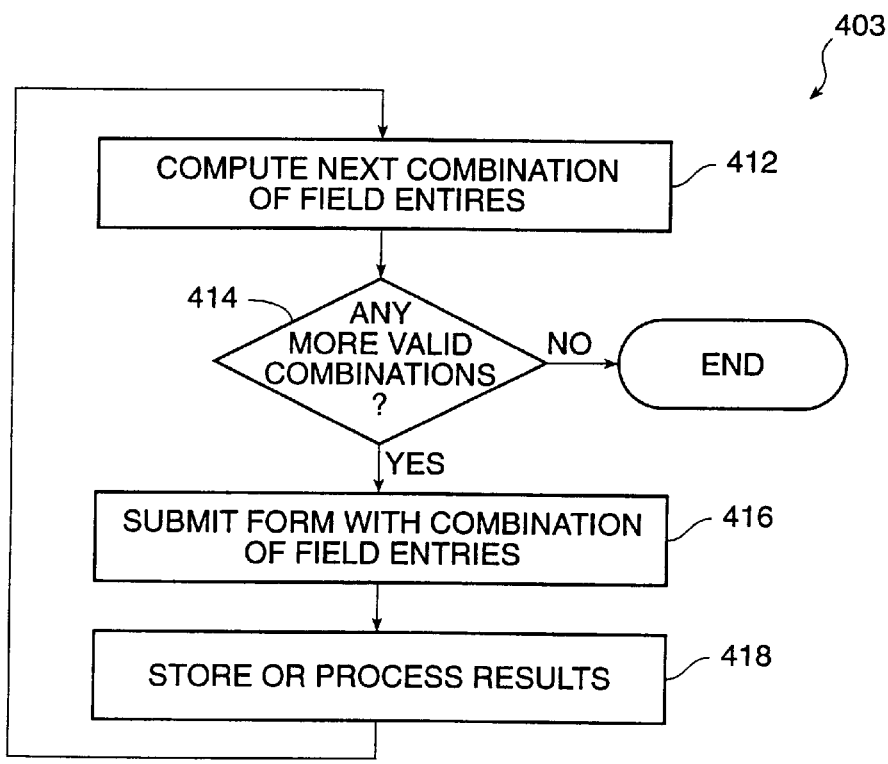
FIG. 4B depicts a flowchart of process steps in processing a form by a wrapper in accordance with a particular embodiment of the invention.

FIG. 4B depicts flow chart 403 of the steps which a wrapper coded with the code fragment of lines 1–6 executes during the processing of step 406, FIG. 4A. In a step 412 a combination of input values for each of the fields is computed. In select embodiments, the combination of input values is a Cartesian product of the possible values for the fields. Next, in a decisional step 414, a determination is made whether all combinations have been attempted. If this is so, then processing for this form has been completed and the routine terminates. Otherwise, in a step 416, the set of values arrived at in step 412 is used by the wrapper to submit the form. Note that wrapper code values override default values specified in the form itself. In a step 418, the output from the submission of the form is provided to other processes, or in this case, stored in variable $output. Finally, processing returns back to step 412, in order to process another combination of inputs to the form until, in step 414, it is determined that all possible relevant combinations have been tried.

4.0 Forms with Complex Features

Certain forms may provide for multiple submit buttons, each submit button having a different behavior. An SDL statement coded with the form statement such as in line 8 enables the results from submitting the form using the alternate_submit button to be placed in the variable $output.

8. $output <=OUTPUT(alternate_submit)

FIG. 3C depicts a technique used in a form for indicating to the user that by selecting a button with her mouse or other input device causes the retrieval of another page of information. FIG. 3D depicts the HTML code required to implement the button feature of a form depicted in FIG. 3C. Run-time support functions enable wrappers to access information from subsequent pages using the button mechanism depicted in FIGS. 3C and 3D. An SDL "function" statement is coded to cause a wrapper to search through the HTML of FIG. 3D in order to obtain the information contained in a subsequent page. Lines 9–13 herein below depict a representative function statement for accessing information from a page using the button mechanism. Line 9 depicts the function statement, having a URL of the page using the button mechanism, followed by the URL of a subsequent page which contains information. Line 10 specifies that the URL of the current form is an input to the wrapper as a parameter "src." Line 11 indicates that a "next 10" string is an input to the wrapper as a parameter "pattern." Line 12 indicates that a "1" is an input to the wrapper for a "use_cache" parameter. Finally, line 13 indicates to the wrapper that the output "text" is to be stored in a variable $pages.

```
 9. FUNCTION :: $first_page :: $cache->next_url
10. $first_page => #INPUT(src)
11. "NEXT 10"=> #INPUT(pattern)
```

-continued

```
12. '1'=> #INPUT(use_cache)
13. $pages <= #OUTPUT(text)
```

FIG. 3E depicts a second technique used in a form for indicating to the user that selecting a form with her mouse or other input device causes the retrieval of another page of information. The technique of FIG. 3E for indicating on a form that there is more data to retrieve is a "post" mechanism. FIG. 3F depicts HTML code to implement the form retrieval of FIG. 3E. An SDL "function" statement for obtaining information from a form using the post mechanism for retrieving a next page as depicted in FIG. 3E is shown in lines 14–16 herein below. Line 14 is an SDL "function" statement having a URL of the page using the post mechanism, followed by the URL of a subsequent page which the system is to retrieve. Line 15 indicates that the URL of the current page is an input to the wrapper as a parameter "src." Line 16 indicates that a "get next 25 listings" string is an input to the wrapper as a parameter "submit_pattern." Line 17 indicates that a "1" is input to the wrapper as parameter "use_cache." Finally, line 18 indicates that output "text" from the wrapper is to be stored in a variable $pages.

```
14. FUNCTION :: $first_page :: $cache->next_form_url
15. $first_age => #INPUT(src)
16. 'Get next 25 listings'=> #INPUT(submit_pattern)
17. '1'=> #INPUT(use_cache)
18. $pages <= #OUTPUT(text)
```

Certain fields require multiple values. While this is not a common behavior it is nevertheless important to support. A syntactic means of enabling the specification of multiple values is employed, as was described in line 7 herein above.

5.0 Conclusion

In conclusion, the present invention provides a method for retrieval and interpretation of disparate semistructured information from diverse sources using form based representations, having the advantages of enabling data mining techniques to be applied to web sites rendered as forms, and facilitating access to information imbedded within forms via SQL or other relational database query methods.

Other embodiments of the present invention and its individual components will become readily apparent to those skilled in the art from the foregoing detailed description. As will be realized, the invention is capable of other and different embodiments, and its several details are capable of modifications in various obvious respects, all without departing from the spirit and the scope of the present invention. Accordingly, the drawings and detailed description are to be regarded as illustrative in nature and not as restrictive. It is therefore not intended that the invention be limited except as indicated by the appended claims.

What is claimed is:

1. A method for gathering data around forms in a wrapper program for accessing semistructured information, each form having zero or more fields, each field having one or more possible field values, comprising the steps of:

computing a plurality of combinations for all field values in a particular form;

for a particular combination in said plurality of combinations, submitting said particular form with said particular combination of field values;

providing the results returned from the submitting step for further processing.

2. The method of claim 1 wherein said plurality of combinations is determined by a Cartesian product.

3. The method of claim 1 further comprising the steps of:
applying the submitting and providing steps repeatedly to process all combinations in said plurality of combinations.

4. The method of claim 1 wherein said forms are provided by web pages on the Internet.

5. The method of claim 1 wherein said forms are provided by web pages on an intranet.

6. The method of claim 1 wherein said forms are provided by web pages on an extranet.

7. The method of claim 1 wherein said steps are specified to a computing system using a programming language.

8. The method of claim 1 wherein said data comprises shopping information.

9. The method of claim 1 wherein said data comprises job information.

10. The method of claim 1 wherein said data comprises real estate information.

11. The method of claim 1 wherein said data comprises semistructured information.

12. The method of claim 1 wherein said particular form further comprises an indicator that further information is available on a subsequent page, said subsequent page being retrievable by a mechanism, said mechanism having a trigger for obtaining said subsequent page, further comprising the steps of:
submitting said particular form with said trigger in order to obtain said further information.

13. The method of claim 12 wherein said mechanism is a button mechanism and said trigger is a get event.

14. The method of claim 12 wherein said mechanism is a form mechanism and said trigger is a post event.

15. A method for indexing data around forms in a wrapper program for accessing semistructured information, each form having zero or more fields, each field having one or more possible field values, comprising the steps of:
computing a plurality of combinations for all field values in a particular form;
for a particular combination in said plurality of combinations, submitting said particular form with said particular combination of field values;
providing the results returned from the submitting step for further processing.

16. The method of claim 15 wherein said plurality of combinations is determined by a Cartesian product.

17. The method of claim 15 further comprising the steps of:
applying the submitting and providing steps repeatedly to process all combinations in said plurality of combinations.

18. The method of claim 15 wherein said forms are provided by web pages on the Internet.

19. The method of claim 15 wherein said forms are provided by web pages on an intranet.

20. The method of claim 15 wherein said forms are provided by web pages on an extranet.

21. The method of claim 15 wherein said steps are specified to a computing system using a programming language.

22. The method of claim 15 wherein said data comprises shopping information.

23. The method of claim 15 wherein said data comprises job information.

24. The method of claim 15 wherein said data comprises real estate information.

25. The method of claim 15 wherein said data comprises semistructured information.

26. The method of claim 15 wherein said particular form further comprises an indicator that further information is available on a subsequent page, said subsequent page being retrievable by a mechanism, said mechanism having a trigger for obtaining said subsequent page, further comprising the steps of:
submitting said particular form with said trigger in order to obtain said further information.

27. The method of claim 26 wherein said mechanism is a button mechanism and said trigger is a get event.

28. The method of claim 26 wherein said mechanism is a form mechanism and said trigger is a post event.

29. A method for specifying a wrapper program for accessing semistructured information from a plurality of forms, each form having one or more fields, each field having one or more possible field values, comprising the steps of:
specifying an identity of a particular form in said plurality of forms;
specifying a plurality of input values for said one or more fields of said particular form;
specifying a variable for storing a plurality of data returned from submission of said particular form with said plurality of input values for said one or more fields.

30. The method of claim 29 wherein a particular field is capable of having a plurality of values for a particular submission, further comprising specifying all particular values in said plurality of values using a syntactic means.

31. The method of claim 29 wherein a particular field is restricted to a set of possible values, further comprising specifying a plurality of values for said particular field which are members of said set of possible values.

32. The method of claim 29 further comprising specifying an alternate variable for storing a plurality of data returned from submission of said particular form with said plurality of input values for said one or more fields.

33. The method of claim 29 wherein said forms are provided by web pages on the Internet.

34. The method of claim 29 wherein said forms are provided by web pages on an intranet.

35. The method of claim 29 wherein said particular form further comprises an indicator that further information is available on a subsequent page, said subsequent page being retrievable by a mechanism, said mechanism having a trigger for obtaining said subsequent page, further comprising the steps of:
specifying said particular form with said trigger in order to obtain said further information.

36. The method of claim 35 wherein said mechanism is a button mechanism and said trigger is a get event.

37. The method of claim 35 wherein said mechanism is a form mechanism and said trigger is a post event.

38. The method of claim 29 wherein said specifying steps are performed using a programming language.

* * * * *